(12) United States Patent
Wilson et al.

(10) Patent No.: US 11,623,476 B2
(45) Date of Patent: *Apr. 11, 2023

(54) FIXTURE FOR SPOKE TO SHEAR BAND ATTACHMENT FOR A NON-PNEUMATIC TIRE

(71) Applicant: Compagnie Generale des Etablissements Michelin, Clermont-Ferrand (FR)

(72) Inventors: Brian D Wilson, Greer, SC (US); Eric Rivers, Greenville, SC (US); David Alan Goodenough, Bridgman, MI (US); Glenn Andrew Schimidke, Smyrna, TN (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 992 days.

This patent is subject to a terminal disclaimer.

(21) Appl. No.: 16/464,083

(22) PCT Filed: Dec. 28, 2017

(86) PCT No.: PCT/US2017/068730
§ 371 (c)(1),
(2) Date: May 24, 2019

(87) PCT Pub. No.: WO2018/126018
PCT Pub. Date: Jul. 5, 2018

(65) Prior Publication Data
US 2019/0381827 A1 Dec. 19, 2019

Related U.S. Application Data

(63) Continuation of application No. PCT/US2016/069422, filed on Dec. 30, 2016.

(51) Int. Cl.
*B60B 31/00* (2006.01)
*B60B 5/02* (2006.01)
*B60B 9/26* (2006.01)

(52) U.S. Cl.
CPC ............. *B60B 31/005* (2013.01); *B60B 5/02* (2013.01); *B60B 9/26* (2013.01)

(58) Field of Classification Search
CPC .......... B60B 31/005; B60B 5/02; B60B 9/26; B29D 30/00; B29D 30/02
See application file for complete search history.

(56) References Cited

U.S. PATENT DOCUMENTS

| 1,036,690 | A | 5/1870 | Adams et al. |
| 4,108,233 | A | 8/1978 | Baer et al. |

(Continued)

FOREIGN PATENT DOCUMENTS

| JP | H0796708 A | 4/1995 |
| JP | 2011025759 A | 2/2011 |

OTHER PUBLICATIONS

European Patent Office; International Search Report and Written Opinion for patent application PCT/US2016/069422; dated Oct. 20, 2017; Publisher: European Patent Office, Rijswijk, Netherlands, pp. 1-12, enclosed.

(Continued)

*Primary Examiner* — Jason R Bellinger
(74) *Attorney, Agent, or Firm* — Neal P. Pierotti

(57) ABSTRACT

An apparatus for assembling a non-pneumatic tire is provided that includes a plurality of elements that move relative to a base. The elements have a central axis that extends in a longitudinal direction, and the elements are disposed in a circumferential direction around the central axis. The apparatus also includes a radial movement member that moves in a radial direction, a hub, a shear band, and a plurality of (Continued)

spokes that are attached to the hub. The radial movement member moves outward in the radial direction and urges the elements to move relative to the base such that the elements urge the spokes to move outward in the radial direction. Adhesive engages the spokes and the shear band at an attachment location of the spokes and the shear band.

15 Claims, 10 Drawing Sheets

(56) References Cited

U.S. PATENT DOCUMENTS

| | | | |
|---|---|---|---|
| 8,091,596 B2* | 1/2012 | Louden | B60B 9/02 |
| | | | 152/80 |
| 9,387,637 B2* | 7/2016 | Martin | B29D 30/02 |
| 10,870,314 B2* | 12/2020 | Wilson | B60B 23/00 |
| 11,104,089 B2* | 8/2021 | Gaut | B29C 45/1459 |
| 11,235,616 B2* | 2/2022 | Delfino | B60B 9/04 |
| 2014/0070439 A1 | 3/2014 | Martin | |
| 2019/0001598 A1* | 1/2019 | Delfino | B60B 9/26 |
| 2019/0001745 A1* | 1/2019 | Delfino | B60C 7/14 |
| 2020/0276863 A1* | 9/2020 | Wilson | B60B 31/02 |
| 2020/0376789 A1* | 12/2020 | Lung | B60B 31/005 |

OTHER PUBLICATIONS

European Patent Office; International Search Report and Written Opinion for patent application PCT/US2017/068730; dated Mar. 27, 2018; Publisher: European Patent Office, Rijswijk, Netherlands, pp. 1-11, enclosed.

* cited by examiner

FIXTURE FOR SPOKE TO SHEAR BAND ATTACHMENT FOR A NON-PNEUMATIC TIRE

CROSS-REFERENCE TO RELATED APPLICATIONS

The present application is a 35 U.S.C. §371 application of PCT/US17/68730 filed on Dec. 28, 2017 and entitled "Fixture for Spoke to Shear Band Attachment for A Non-Pneumatic Tire." PCT/US17/68730 claims the benefit of PCT/US16/69422 filed on Dec. 30, 2016 and entitled "Fixture for Spoke to Shear Band Attachment for a Non-Pneumatic Tire." PCT/US17/68730 and PCT/US16/69422 are both incorporated by reference herein in their entireties for all purposes.

FIELD OF THE INVENTION

The subject matter of the present invention relates to fixtures for the production of non-pneumatic tires. More particularly, the present application involves a fixture that includes elements that are actuated to cause spokes within the fixture to be moved radially outward and adhered onto an inner surface of a shear band of a non-pneumatic tire.

BACKGROUND OF THE INVENTION

Non-pneumatic tires are those that do not require air. These tires instead feature a hub that is mounted onto a wheel of a vehicle, and a series of spokes that extend radially outward from the hub. The spokes can be attached to a shear band that includes tread of the tire. The spokes can be arranged and manufactured in a number of ways. Further, any number of spokes can be used in the design of non-pneumatic tires. However, when large numbers of spokes are used manufacturing problems arise. The large numbers of spokes require the spokes be positioned close to one another, and in these instances the spokes cannot be formed with the shear band as part of a complete assembly. For a non-pneumatic tire to be constructed in a uniform manner, the circumferential and lateral precision of location of the spokes should be within 0.2 millimeters. Further, variations in spokes to spoke flange thicknesses exist in the manufacture of spokes, which also should be taken into account in any subsequent assembly process. Due to the various manufacturing challenges associated with the production of non-pneumatic tires, a mechanism for addressing and improving upon issues associated with their production would be beneficial.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figure 1:
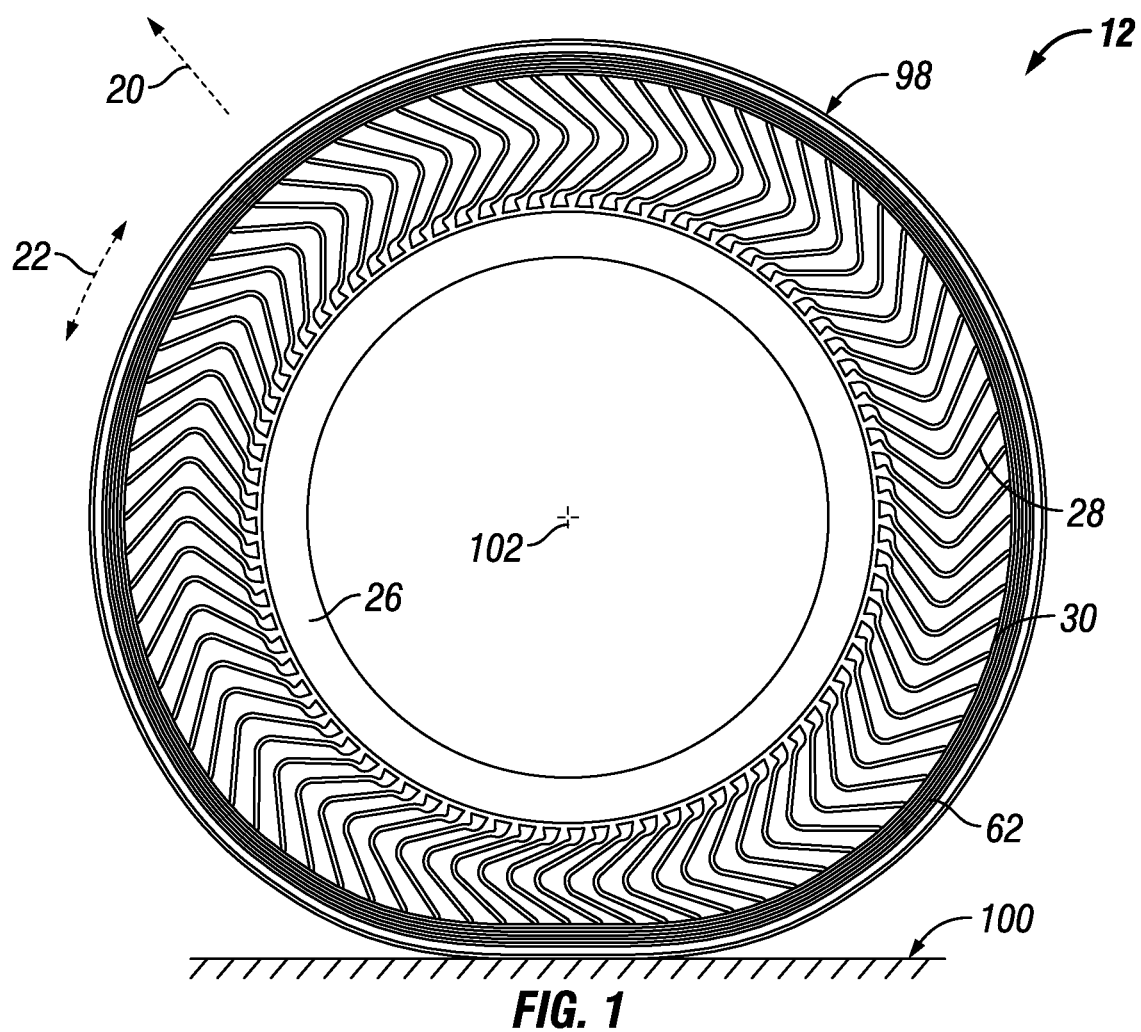
FIG. 1 is a side view of a non-pneumatic tire.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for an apparatus 10 that is used in the construction of a non-pneumatic tire 12. The non-pneumatic tire 12 has a plurality of spokes 28 that are connected to a hub 26. The apparatus 10 connects the spokes 28 on an opposite end from the hub 26 to a shear band 62. The apparatus 10 includes a number of elements 16 disposed about a central axis 18 in which the spokes 28 are disposed between successive elements 16 in the circumferential direction 22. The hub 26 and attached spokes 28 of the non-pneumatic tire 12 are placed into the apparatus 10, and one or more radial movement members 24 of the apparatus 10 are actuated in order to press the elements 16 outward in the radial direction 20. The spokes 28 engage the shear band 62 and adhesive 30 at their junction is used to cause them to be connected to one another. The apparatus 10 thus results in a series of spokes 28 that are connected to the shear band 62 of the non-pneumatic tire 10.

FIG. 1 shows a non-pneumatic tire 12 in accordance with one exemplary embodiment. The non-pneumatic tire 12 has an axis 102 at its center, and the radial direction 20 extends from the axis 102. Tread 98 is located on the outer exterior of a shear band 62 and extends all the way around the non-pneumatic tire 12 in the circumferential direction 22. The shear band 62 is located inward in the radial direction 20 from the tread 98 and likewise extends 360 degrees around the axis 102 in the circumferential direction 22. A series of spokes 28 engage the shear band 62 and extend inward in the radial direction 20 from the shear band 62 to a hub 26 of the non-pneumatic tire 12. Any number of spokes 28 can be present, and their cross-sectional shape can be different from that shown. In some embodiments, from 64-80 spokes 28 are present in the non-pneumatic tire 12. The hub 26 is located inward from the spokes 28 in the radial direction 20 and can be mounted onto a wheel of the vehicle.

The spokes 28 at the top of the non-pneumatic tire 12 are in tension, and the spokes 28 at the bottom are in compression as the non-pneumatic tire 12 rests on the ground 100 and as the non-pneumatic tire 12 turns in normal operation of the vehicle.

Figure 2:
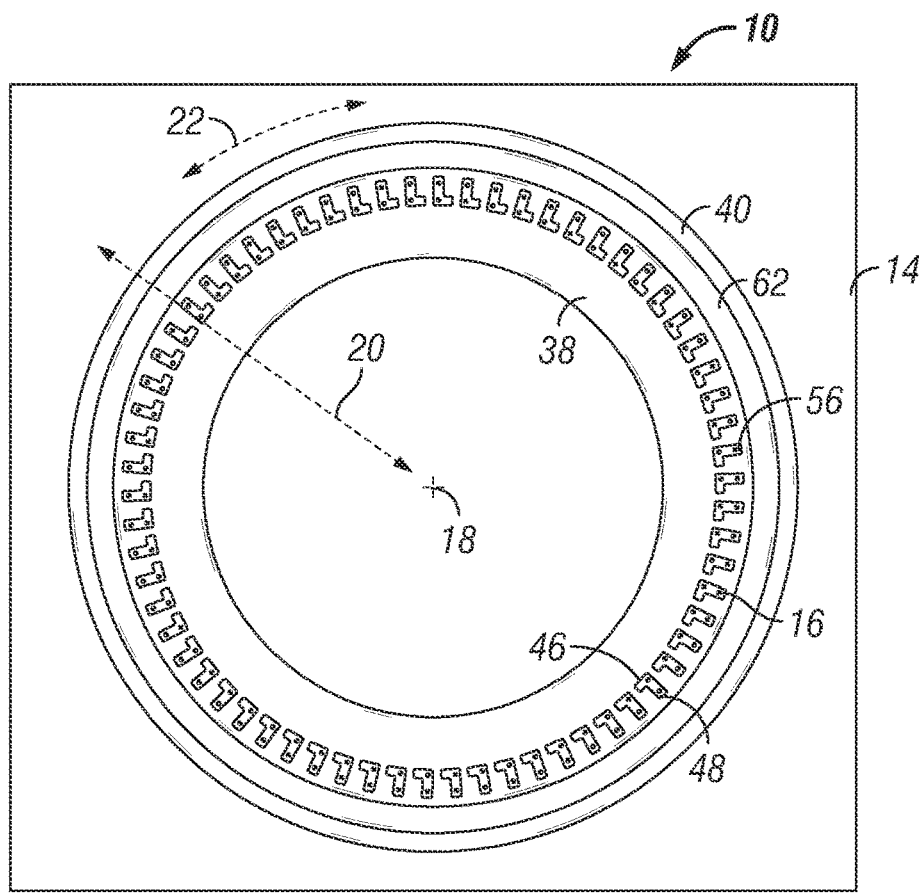
FIG. 2 is a top view of an apparatus for forming the non-pneumatic tire.
Figure 3:
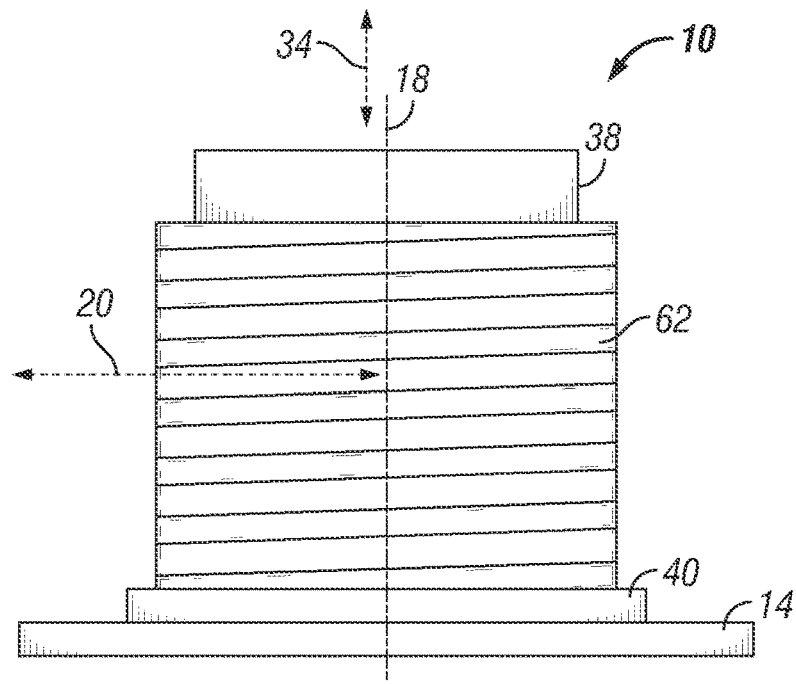
FIG. 3 is a side view of the apparatus of FIG. 2.
Figure 4:
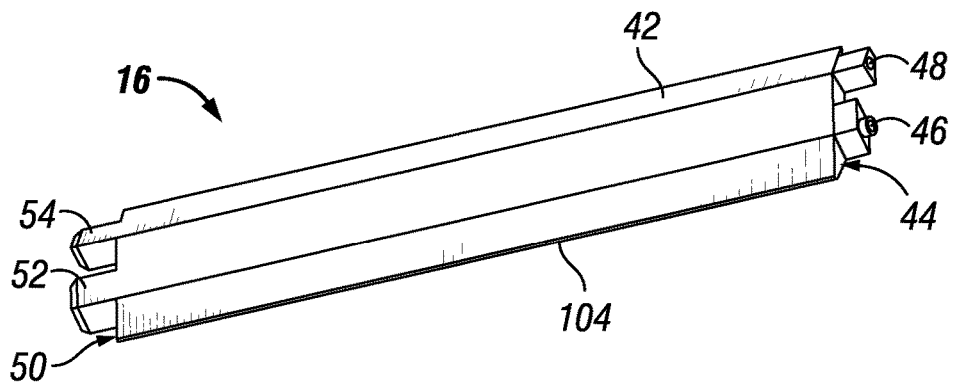
FIG. 4 is a perspective view of a first element.
Figure 5:
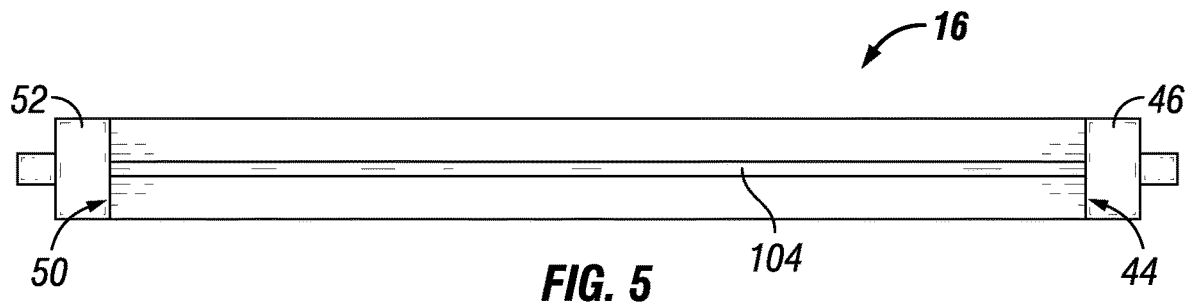
FIG. 5 is a front view of the first element of FIG. 4.

The apparatus 10 is a mechanism that attaches the spokes 28 of the non-pneumatic tire 12 to the shear band 62. The spokes 28 and hub 26 are attached to one another before the spokes are attached to the shear band 62 in the apparatus 10. FIGS. 2 and 3 shows one embodiment of the apparatus 10 that includes a base 14 that can include an upper base section 38 and a lower base section 40. The sections 38, 40 may be of any shaped and are separated in the longitudinal direction 34. Columns, pins, or other members can be used to attach these sections 38, 40 to one another. A shear band 62 can rest onto the lower base section 40 and can be located in the radial direction 20 beyond various portions of the apparatus 10. The base 14 may define a central aperture through its center that is coaxial with the axis 102 of the non-pneumatic tire 12. In other embodiments, the base 14 lacks an aperture through its center. The upper base section 38 defines a series of upper slots 56 that extend in the radial direction 20. The upper slots 56 may be located on the outer radial portion of the upper base section 38 and may extend for less than half of the radial length of the upper base section 38 in the radial direction 20. A series of elements 16 are visible through the upper slots 56 and can be in the upper slots 56. There may be the same number of elements 16 and upper slots 56 in the apparatus 10. The elements 16 may be located under the upper base section 38 and thus in between this section 38 and the lower base section 40 in the longitudinal direction 34. The elements 16 are disposed about a central axis 18 in the circumferential direction 22. The central axis 18 is coaxial with the axis 102 of the non-pneumatic tire 12.

Figure 6:
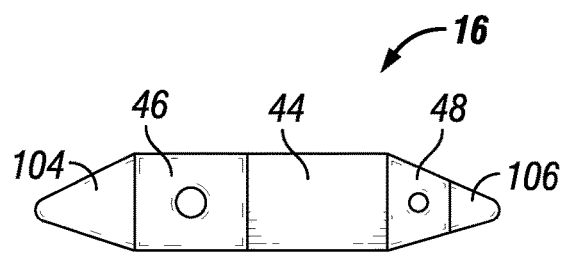
FIG. 6 is a top view of the first element of FIG. 4.
Figure 7:
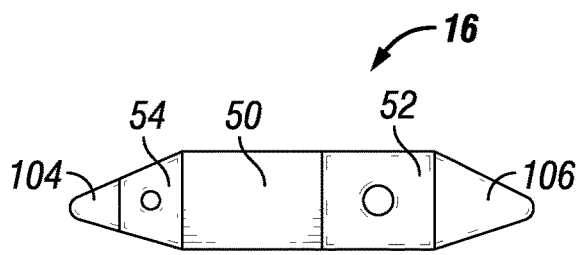
FIG. 7 is a bottom view of the first element of FIG. 4.

FIGS. 4-7 show the element 16 in accordance with one exemplary embodiment. The element 16 is a first element 42 and all of the elements 16 of the apparatus 10 may be configured in the same manner as the first element 42. The first element 42 has a leading edge 104 that is angled or triangular in shape. The tailing edge 106 of the first element 42 is likewise angled or triangular in shape and is separated from the leading edge 104 by a body that is rectangular in shape. The first element 16 may be differently shaped in other exemplary embodiments. The first end 44 extends from the leading edge 104 to the tailing edge 106 and has a first projection 46 and a second projection 48. The projections 46, 48 extend outward from the first end 44 and are separated from one another. A second end of 50 likewise extends from the leading edge 104 to the tailing edge 106 and is located opposite from the first end 44. A third projection 52 and a fourth projection 54 extend from the second end 50 and are separated from one another. The first projection 46 and the third projection 52 may be sized and shaped the same and can be located the same distance from the tailing edge 106. Likewise, the second projection 48 and the fourth projection 54 can be sized and shaped the same as one another and can be located the same distance from the leading edge 104. With reference to FIG. 6, the first projection 46 may be located between and not at the leading and tailing edges 104, 106, while the second projection 48 is located at the tailing edge 106. With reference to FIG. 7, the fourth projection 54 can be located at the leading edge 104, and the fourth projection 52 may be located between the leading and tailing edges 104, 106 and not at either of these edges 104, 106. In other embodiments, the size and placement of the various projections 46, 48, 52, 54 can be different from those shown.

Figure 8:
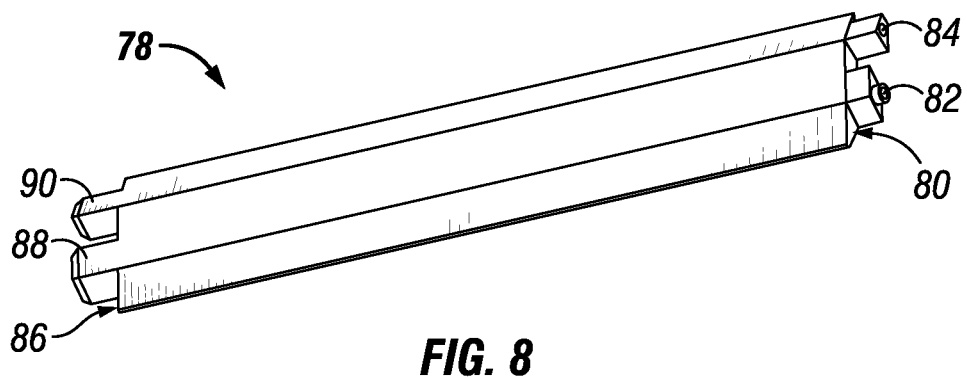
FIG. 8 is a perspective view of a second element.

FIG. 8 shows a second element 78 of the elements 16. The second element 78 may include features that are similar to the first element 42. For example, the second element 78 has a second element first end 80 with a second element first projection 82 and a second element second projection 84. On the opposite side, a second element second end 86 is present that includes a second element third projection 88 and a second element fourth projection 90. The other elements 16 in the apparatus 10 may be provided in a similar manner, or they may be different from one another in accordance with various exemplary embodiments. The elements 16 can be aluminum extrusions that are subsequently machined. Alternatively, the elements 16 may be made out of other materials such as high modulus plastic.

Figure 9:
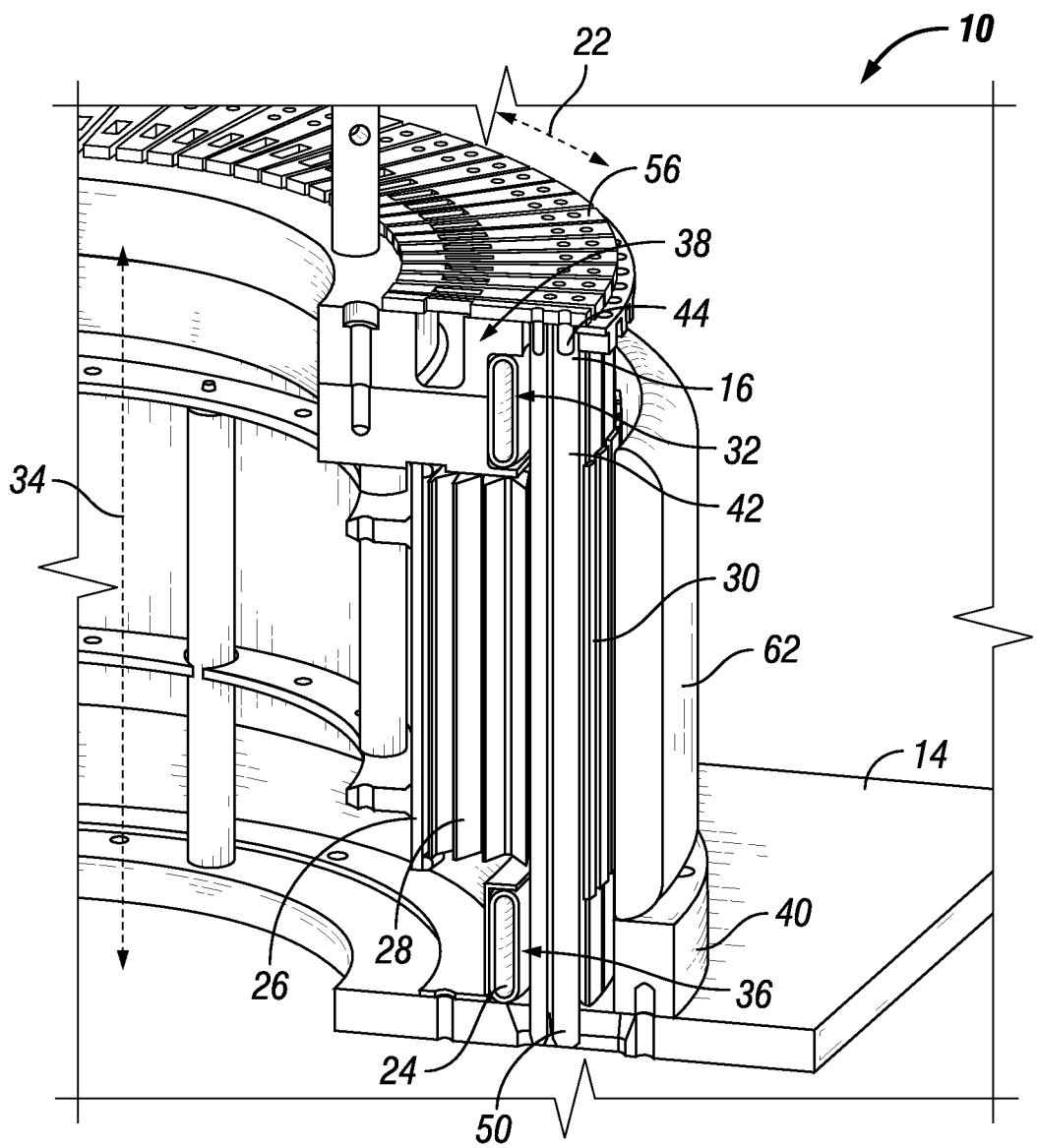
FIG. 9 is a cut out view in perspective of a portion of the apparatus.

A perspective view of a cut out of the apparatus 10 is shown in FIG. 9. The base 14 includes the upper base section 38 mounted to the lower base section 40 with a series of columns. The shear band 62 rests onto the lower base section 40, and the hub 26 with attached spokes 28 are located in the apparatus 10 and are spaced from the shear band 62 and not in engagement therewith. The elements 16 are present in the apparatus 10 and extend in the longitudinal direction 34 from the lower base section 40 to the upper base section 38. The apparatus 10 includes a radial movement member 24 that functions to move the elements 16 radially outward towards the shear band 62 so that the spokes engage the shear band 62 for attachment thereto. The radial movement member 24 is shown as including a first pneumatic bladder 32 and a second pneumatic bladder 36. The first pneumatic bladder 32 is located within a recess of the upper base section 38 and extends 360 degrees around the central axis 18. The second pneumatic bladder 36 is located within a recess of the lower base section 40 and likewise extends 360 degrees around the central axis 18. The bladders 32 and 36 are not inflated in FIG. 9. A pressure supply (not shown) can be present and used to inflate the bladders 32, 36 with air. A line (not shown) from the pressure supply can be connected to the bladders 32, 36 to transport air therein for inflation. Other gasses besides air can be used to inflate the two pneumatic bladders 32, 36 in other embodiments. Inflation of the bladders 32, 36 causes them to expand outward in the radial direction 20. The spokes 28 are located between the pneumatic bladders 32, 36 in the longitudinal direction 34 and do not engage either one of the pneumatic bladders 32, 36. However, upon actuation the bladders 32, 36 will engage the elements 16 and cause them to move outward in the radial direction 20. In some versions, the bladders 32, 36 may in fact engage the spokes 28 even when the bladders 32, 36 are uninflated.

Figure 10:
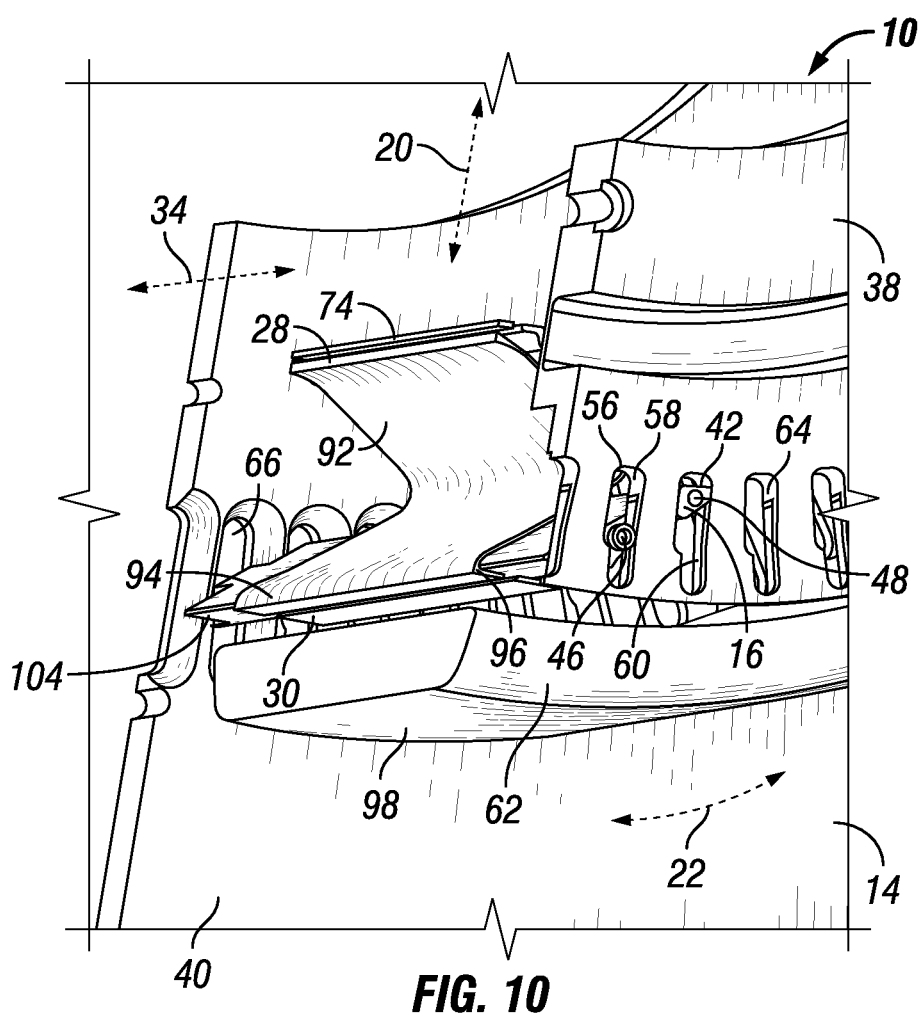
FIG. 10 is a cut out view in perspective of a portion of the apparatus.

FIG. 10 is a perspective view of a cut out of the apparatus 10 in which only a single spoke 28 and a single element 16 are shown. The remaining spokes 28 and elements 16 are not shown for purposes of clarity in the figure. The upper base section 38 has a series of upper slots 56 that extend in the radial direction 20 and have a portion wider in the circumferential direction 22 and a portion narrower in the circumferential direction 22 that are in communication with one another. The wider portion is closer to the central axis 18 in the radial direction 20. The element 16 illustrated is the first element 42 and the first projection 46 of the first element 42 is located within the first upper slot 58. The second projection 48 of the first element 42 is located within the second upper slot 60. A third upper slot 64 is located next to the second upper slot 60 in the circumferential direction 22 but none of the projections of the first element 42 are located within the third upper slot 64. The projections 46 and 48 remain in the upper slots 58 and 60 and are not removed therefrom. Although difficult to see in FIG. 10, the opposite end of the first element 42 features third and fourth projections 52, 54 that are likewise disposed into lower slots 66 of the lower base section 40. The first element 42 is held into the base 14 through the use of the projections 46, 48, 52, 54 disposed within the slots 56, 66. The projections 46 and 48 can move within the first and second upper slots 58 and 60, and the other projections 52, 54 can move within the lower slots 66, so that the first element 42 can move outward in the radial direction 20 relative to the base 14.

The leading edge 104 of the first element 42 is located within a notch 96 of the first spoke 74 that is defined by the body 92 of the first spoke 74 and a flange 94 of the first spoke 74. The first element 42 may engage the first spoke 74 when the radial movement member 24 is in the unactuated position, or in some instances the first element 42 may be free from engagement with the first spoke 74 when the radial movement member 24 is unactuated. Adhesive 30 is located on the flange 94 and the first element 42 and the adhesive 30 are both free from engagement with the shear band 62 in FIG. 10 when the radial movement member 24 is in the unactuated position. When the radial movement member 24 actuates, the first element 42 is pushed outward in the radial direction 20 and the first projection 46 slides along the first upper slot 58, and the second projection 48 slides along the second upper slot 60 in the radial direction 20. The leading edge 104 engages the flange 94 and the flange 94 is likewise moved outward in the radial direction 20. The adhesive 30 on the flange 94 is moved into engagement with the inner surface of the shear band 62 and pressure from the first element 42 can be applied to the attachment location to effect attachment of the flange 94 to the shear band 62. In other arrangements, the adhesive 30 is located alternatively on the shear band 62 instead of on the first element 42, or is located both on the first element 42 and the shear band 62. FIG. 10 shows only the first element 42 of the elements 16 and not the rest of the various elements 16 and slots 56, 66. The remaining elements 16 and slots 56, 66 can be arranged in a manner similar to that discussed with reference to the first element 42, first and second upper slots 58 and 60, and first and second lower slots 68 and 70, and a repeat of this information is not necessary. In this manner, all of the flanges 94 of the various spokes 28 can be extended outward in the radial direction 20 and into engagement with the shear band 62 and attached thereto.

Although each one of the elements 16 is disposed within a pair of adjacent slots 56 at the top, and a pair of adjacent slots 66 at the bottom, it is to be understood that each of the elements 16 could be disposed within a single one of the slots 56 and 66, or may be disposed within 3, 4, 5, or from 6-10 of the slots 56, 66 in accordance with other exemplary embodiments.

Figure 11:
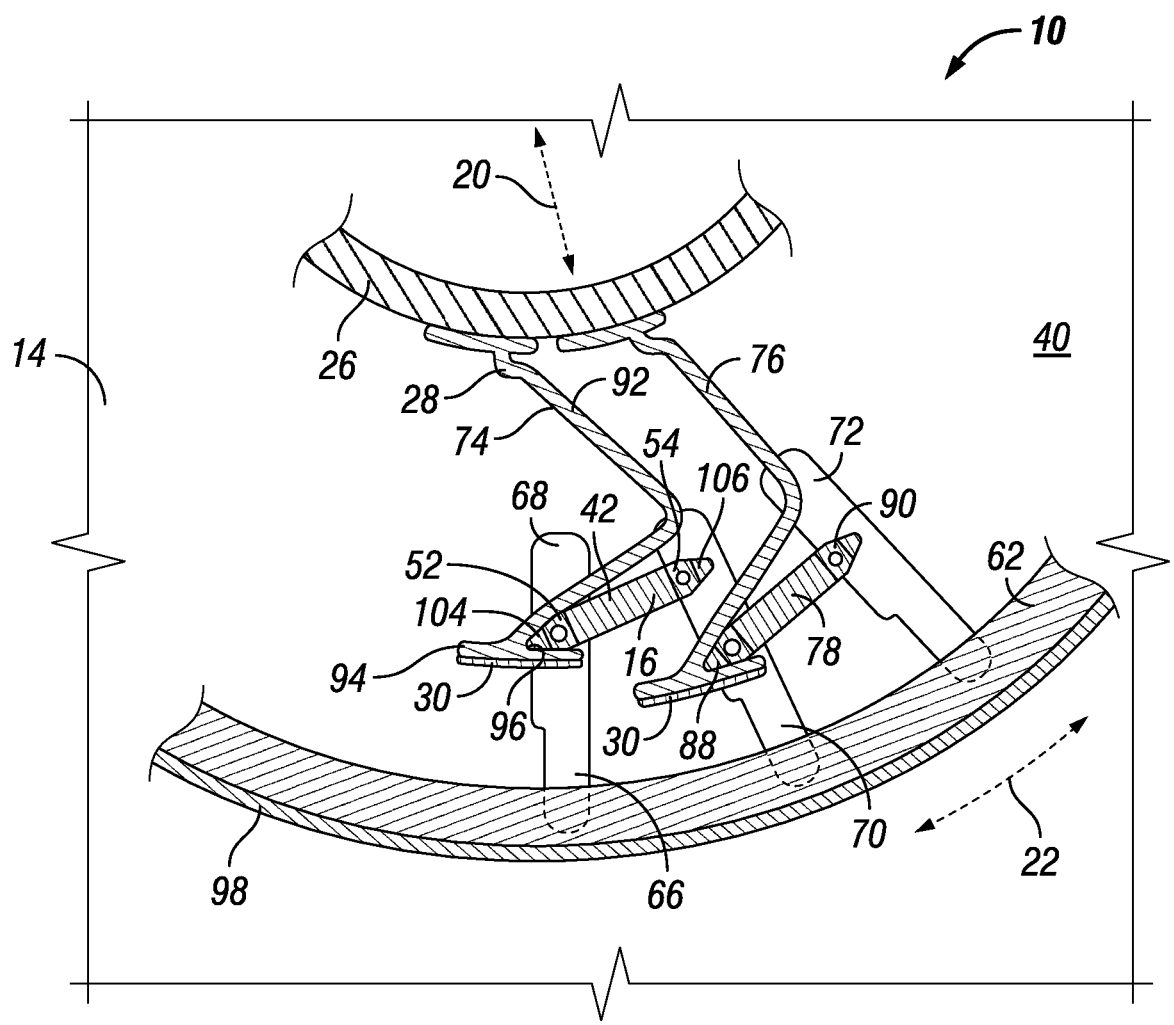
FIG. 11 is a plan view in cross-section of a portion of the apparatus in an unactuated state.

FIG. 11 is a cross-sectional view of the apparatus 10 that shows the spokes 28 in the unactuated position. A first spoke 74 and a second spoke 76 of the plurality of spokes 28 are shown in FIG. 11. The spokes 74, 76 are attached to the hub 26, and this attachment may be done before the hub 26 and spokes 28 are placed between the various elements 16. The first spoke 74 has a body 92 that is V-shaped and that terminates in the radial direction 20 at a flange 94 that has a surface that extends in the circumferential direction 22. The adhesive 30 may be applied onto the outer surface of the flange 94 so that it faces away from the central axis 18. The application of the adhesive 30 may likewise be done before the hub 26 and spokes 28 are placed between the elements 16. The flange 94 is oriented with respect to the body 92 so that a notch 96 is defined between these two portions of the first spoke 74. The spokes 28 can be described as having a hairpin type spoke shape due to the body 92 that is V-shaped. The spokes 28 may be made from a thermoplastic material or from reinforced rubber. The spokes 28 may be first molded in individual molding cavities and then subsequently attached to the hub 26.

The first element 42 and the second element 78 of the plurality of elements 16 are illustrated in FIG. 11 and the radial movement member 24 (not shown) is in the unactuated position. The elements 42, 78 are spaced from the hub 26 and the shear band 62 in the radial direction 20 and are not in engagement with these components 26, 62. The lower slots 66 are illustrated in the figure, and of these the first lower slot 68, second lower slot 70, and third lower slot 72 are shown in successive order in the circumferential direction 22. The lower slots 66 can extend all the way around the lower base section 40 in a similar manner to the lower slots 66 shown in FIG. 11, as can the elements 16 and spokes 28 as previously explained. The lower slots 66 may extend in the radial direction 20 so that a portion of them is directly below the shear band 62 in the radial direction 20 and so that a portion of them is radially inward of the shear band 62.

The first element 42 has a third projection 52 that is received within the first lower slot 68, and a fourth projection 54 that is received within the second lower slot 70. The third projection 52 may extend across the entire width of the first lower slot 68 in the circumferential direction 22 so that it engages the lower base section 40 at both ends in the circumferential direction 22. Likewise, the fourth projection 54 may extend across the entire width of the second lower slot 70 in the circumferential direction 22 so that it engages the lower base section 40 on either side. In other arrangements, the various projections of the elements 16 need not extend across the widths of their respective slots 56, 66 such that they do not engage the base sections 38, 40 on one or both sides. The first element 42 is oriented with respect to the central axis 18 such that an outer surface of the body 92 that faces away from the central axis 18 is angled in the radial direction 20 and thus faces away from the central axis 18 at an angle thereto. The leading edge 104 is disposed within the notch 96 of the first element 42 and has a shape that is complimentary to the notch 96 so that the notch 96 is completely filled and so that the leading edge 104 engages the first element 42 at this location. In this regard, the leading edge 104 has a cross-sectional profile that matches up with the shape/profile of the notch 96 of the spoke 28 to which the leading edge 104 is engaged. The tailing edge 106 is free from engagement with the first spoke 74 and the second spoke 76 and is located at the second lower slot 70. Portions of the body 92 are in engagement with the first element 42, and portions are out of engagement with the first element 42. The first element 42 may also be free from engagement with the second spoke 76 when the radial movement member 24 is unactuated. The flanges 94 and the adhesive 30 on the flanges 94 of the spokes 74, 76 are free from engagement with the shear band ring 62 and are spaced from it in the radial direction 20.

The second spoke 76 is arranged in the same manner as the first spoke 74 and is likewise attached to the hub 26 when the hub 26 and spokes 28 are loaded into the apparatus 10 with the elements 16. The second element 78 is disposed within the notch of the second spoke 76 and engages the second spoke 76 in the unactuated state of the radial movement member 24. The second element third projection 88 is disposed within the second lower slot 70, and the second element fourth projection 90 is disposed within the third lower slot 72. As such, two projections 54 and 88 from two different elements 42 and 78 are located within the same slot 70. This arrangement is the same for all of the elements 16 and slots 56, 66 throughout the apparatus 10 although only one such arrangement is shown in FIG. 11 for purposes of clarity. As such, it is the case that all slots 56, 66 in the apparatus 10 have projections from two different elements 16 located therein.

Figure 12:
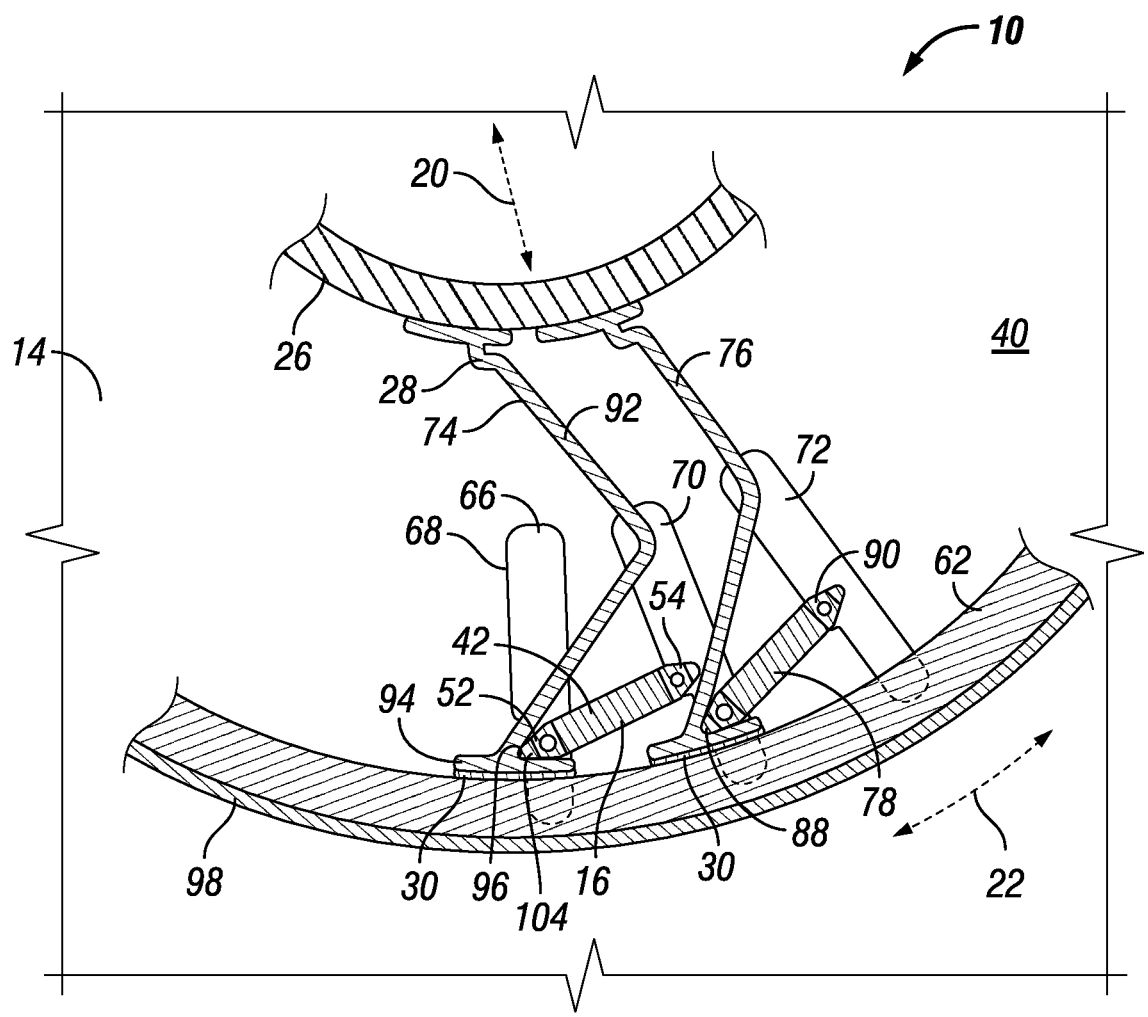
FIG. 12 is a plan view in cross-section of the portion of the apparatus in FIG. 11 in an actuated state.

Actuation of the radial movement member 24 causes the apparatus 10 to assume the configuration shown in FIG. 12 in which the first spoke 74 and the second spoke 76 are moved into engagement with the inner surface of the shear band 62. When actuated, the radial movement member 24 exerts force on the first element 42 which causes it to slide along the first and second lower slots 68, 70 outward in the radial direction 20. As the leading edge 104 is located within the notch 96 of the first spoke 74, the first spoke 74 is likewise moved outward in the radial direction 20. The first element 42 does not rotate as it moves from the unactuated position of FIG. 11 to the actuated position of FIG. 12 but rather slides outward in the radial direction 20 along the first and second lower slots 68, 70. However, in some arrangements the first element 42 may in fact rotate some amount in moving from the unactuated to the actuated position. As shown, the first spoke 74 is attached to the hub 26 and this connection remains even after the radial movement member 24 is actuated. However, upon actuation, the body 92 will stretch out and thus extend in the radial direction 20 upon the application of force by the first element 42. The V-shape of the body 92 will become elongated as the first element 42 forces the flange 94 and adhesive 30 against the interior of the shear band 62. As such, a portion of the first spoke 74 will deform and move when the first element 42 acts against it, and a portion of the first spoke 74 will not move and will remain stationary when actuation occurs.

The second spoke 76 moves in the same manner as the first spoke 74 when the radial movement member 24 is actuated and the second element 78 moves outward in the radial direction 20 to push the second spoke 76 and its adhesive 30 against the shear band 62. In this manner, all of the spokes 28 are stretched outward in the radial direction 20 when the radial movement member 24 is actuated to cause them to engage the shear band 62. Upon full radial movement of the elements 42 and 78, it may be the case that the first element 42 engages the second spoke 76 as well as the first spoke 74. In this regard, it may be the case that all of the elements 16 engage two of the spokes 28 when the elements 16 are at their outermost radial location upon full actuation of the radial movement member 24. In other versions, each one of the elements 16 engage but a single one of the spokes 28 at any one time from non-actuation to full actuation of the radial movement member 24. A portion of the elements 16 may extend outward in the radial direction 20 so that they are under the shear band 62 as viewed from the top in FIG. 12. The various elements 16 can move independently of one another so that movement of one element 16 does not cause the other element 16 to move.

Figure 13:
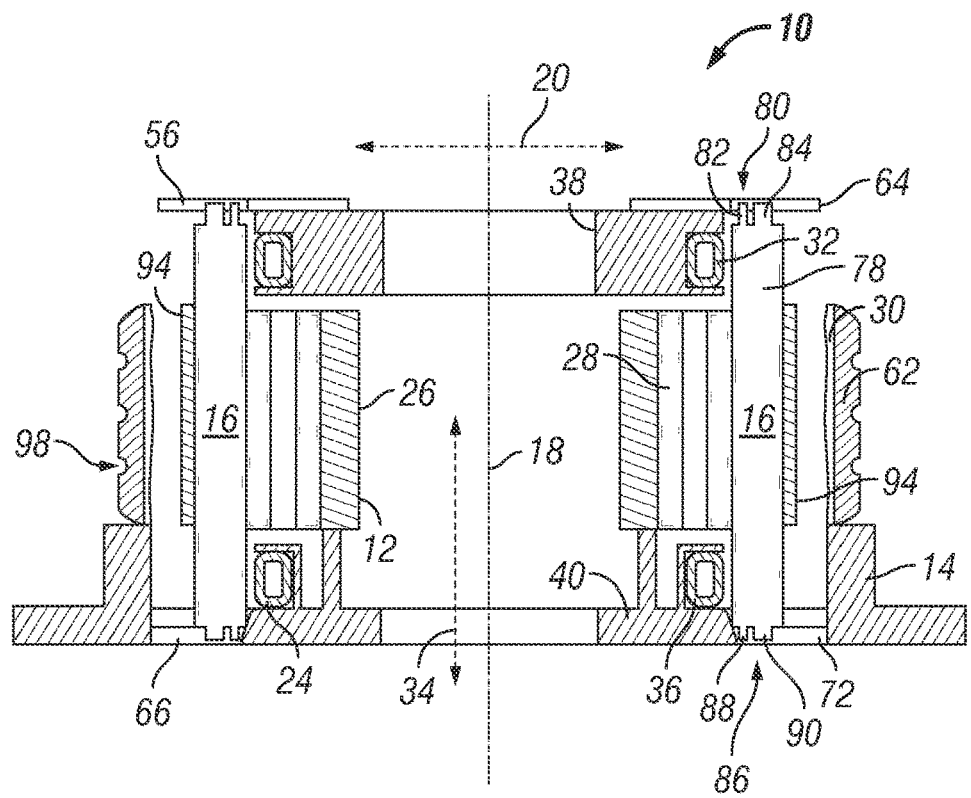
FIG. 13 is an elevation view in cross-section of an apparatus in an unactuated state.
Figure 14:
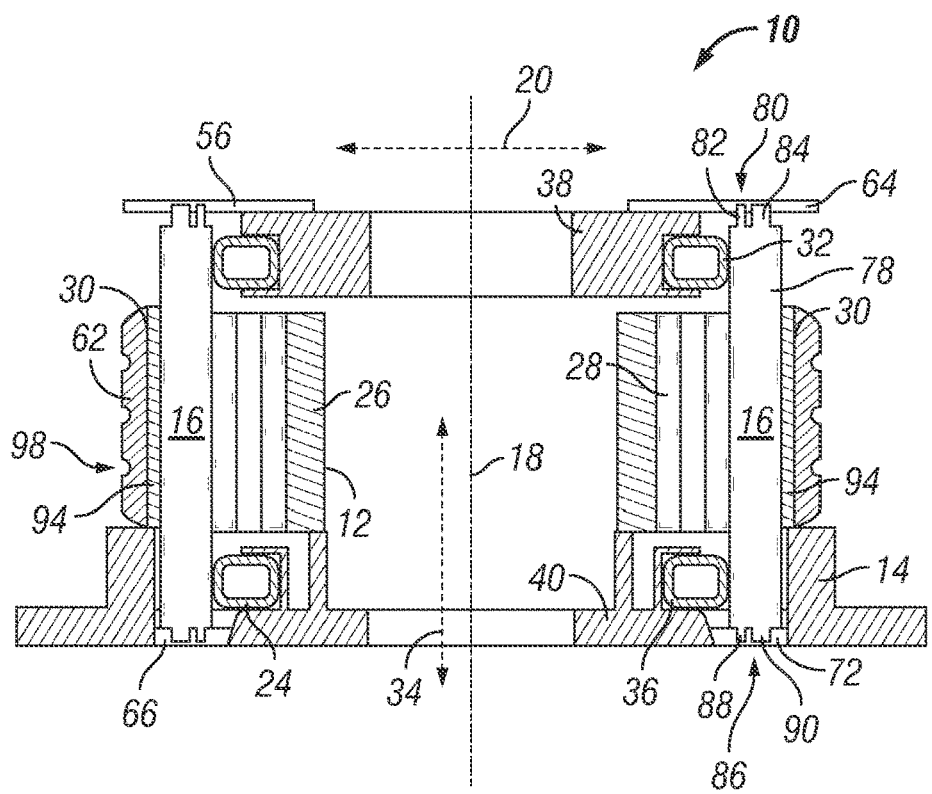
FIG. 14 is an elevation view in cross-section of the apparatus in FIG. 13 in an actuated state.

FIG. 13 is a cross-sectional view of the apparatus with the radial movement member 24 in the unactuated position, and FIG. 14 is the same view as FIG. 13 but instead with the radial movement member 24 in the actuated state. In FIG. 13, the radial movement member 24 is in the unactuated state and is composed of a first pneumatic bladder 32 located within a recess of the upper base section 38, and a second pneumatic bladder 36 recessed within the lower base section 40. The shear band 62 is separated from the flanges 94 of the various spokes 28. The second element 78 is shown as being positioned within the third upper slot 64 and the third lower slot 72. A central aperture extends completely through the base 14, and the central axis 18 is coaxial with the axis 102 of the non-pneumatic tire 12. The first and second pneumatic bladders 32, 36 are located inboard of the elements 16 in the radial direction 20. To form the attachment, the hub 26 with previously formed or attached spokes 28 is treated with adhesive 30 that is placed onto the outer radial ends of the spokes 28. This application may be done with a robot and adhesive dispenser. Additionally or alternatively, as shown in FIG. 13 the adhesive 30 may be applied to the shear band 62. The upper base section 38 is opened or removed from the lower base section 40 to then allow the hub 26 with attached spokes 28 to be lowered or otherwise positioned into the apparatus 10 by being placed onto the lower base section 40 with the spokes 28 each between successive elements 16. In other embodiments, the elements 16 are connected to the upper base section 38 so that when opened, the hub 26 and spokes 28 are placed upon the guiding surfaces of the lower base section 40, and then subsequently the elements 16 and located between the spokes 28 when the upper base section 38 is placed down and connected to the lower base section 40. The shear band 62, which may or may not have tread 98, is likewise placed onto the lower base section 40 and this may be before, after, or simultaneously with the placement of the hub 26 and attached spokes 28. The shear band 62 can be placed into the apparatus 10 after the upper base section 38 has been attached to the lower base section 40, or the shear band 62 can be positioned when these sections 38, 40 are detached from or open to one another. The shear band 62 is located so that it is concentrically placed with the hub 26 and spokes 28 and in effect is coaxial with these components.

Once the hub 26, spokes 28, adhesive 30, and shear band 62 are properly positioned, the radial movement member 24 can be actuated by applying pressure through tubing, not shown, into the first and second pneumatic bladders 32, 36. The air expands the bladders 32, 36 so that they move outward in the radial direction 20 as shown in FIG. 14 at which time they engage and force the elements 16 outward in the radial direction 20. Since the bladders 32, 36 are offset from the spokes 28 in the longitudinal direction 34 the spokes 28 do not interfere with the expansion of the bladders 32, 36. Outward radial movement of the elements 16 pushes the ends of the spokes 28 into engagement with the shear band 62 and the adhesive 30 is compressed at this location and effects attachment of the spokes 28 to the shear band 62. The spokes 28 make contact with the shear band 62 with very uniform pressure control regardless of minor part variation of the spokes 28 or shear band 62. Any amount of time and pressure can be used to effect the attachment, and the resulting assembly features an attached hub 26, spokes 28 and shear band 62. In some arrangements, the pneumatic bladders 32, 36 are capped and the apparatus 10 can be moved to an oven if needed until the adhesive 30 is set. Once the adhesive 30 is set, the air pressure is released and the assembled non-pneumatic tire 12 is removed from the apparatus 10. The expanded pneumatic bladders 32, 36 can be deflated after a desired amount of time, and springs, mechanical linkages, or other return mechanisms may be used to push or pull the elements 16 back into their unactuated positions of FIG. 13. The hub 26 with attached spokes 28 and shear band 62 can be removed from the elements 16 and be subsequently treated if necessary to complete the non-pneumatic tire 12. The arrangement of the elements 16 with the radial movement member 24 need not result in a fixed, known amount of displacement every time which results in the movement of the spokes 28 not being a fixed, known amount every time. This can correct for manufacturing variations in the parts and result in a better formed product.

The first and second pneumatic bladders 32 and 36 can be simultaneously inflated at the same time, and at the same amount of pressure. Alternatively, they can be inflated at different times with different amounts of pressure as desired. Although two bladders are shown, it is to be understood that the radial movement member 24 can have any number of bladders in other embodiments. For instance, 1, 3, from 4-6, or up to 10 bladders can be present. Also, each one of the bladders need not extend completely around the central axis 18 in the circumferential direction 22 but can extend less than 360 degrees. Although shown as employing bladders to cause movement in the radial direction 20, the radial movement member 24 need not have bladders in other arrangements of the apparatus 10. For example, pneumatic or hydraulic cylinders of the radial movement member 24 could be used to effect radial motion in some arrangements. In other instances, the radial movement member 24 could employ ball screws, linkages, linear solenoids, or other mechanisms to achieve radial movement of the elements 16 and hence spokes 28. The elements 16 acting on the spokes 28 by the same radial movement member 24 achieves uniform pressure at the junction of the spokes 28 and the shear band 62 so that a consistent adhesive 30 thickness is obtained. This pressure can be precisely controlled and adjusted by the application of the pneumatic bladders 32, 36.

Figure 15:
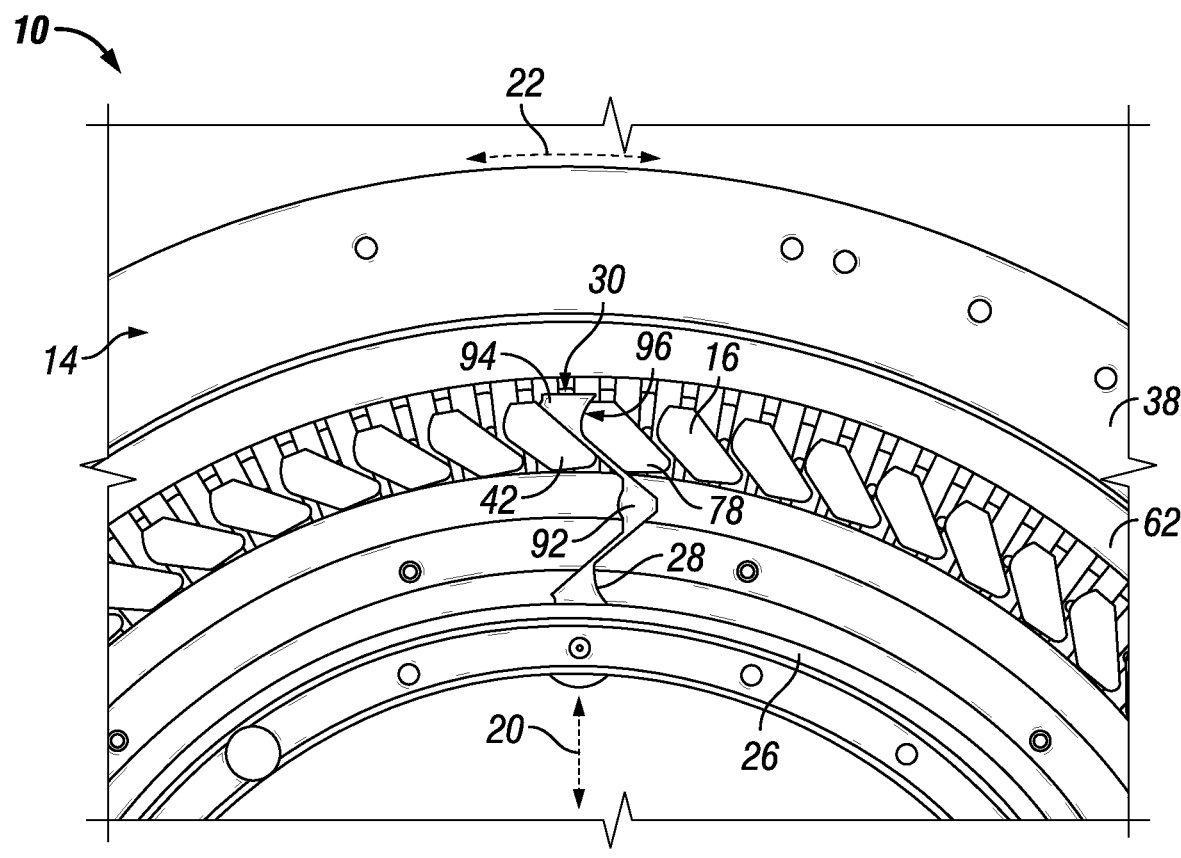
FIG. 15 is a top view of a portion of the apparatus that shows a further alternative design of the spokes and the elements.

FIG. 15 shows an alternate exemplary embodiment of the apparatus 10 in which the spokes 28 are shaped differently than those of previous embodiments. The spokes 28 have a body 92 that is thicker in its center portion than in the legs extending from the body 92 both ways in the radial direction 20. The flange 94 includes a notch 96 and adhesive 30 may again be applied to the outer radial terminal end of the flange 94. Only one of the spokes 28 is illustrated in the figure for clarity. The elements 16 are configured identically to one another and the first and second elements 42, 78 both engage the spoke 28. The second element 78 is disposed within the notch 96, and the first element 42 lays along and contacts the body 92 and also contacts the flange 94 at a portion opposite from the notch 96. The second element 78 aside from engaging the flange 94 likewise contacts the body 92, but on a side opposite from the side that touches the first element 42. Both elements 42, 78 can engage the spoke 28 at all times in the stretching process to pull the spoke 28 from the position shown in FIG. 15 to a position in contact with the shear band 62 to engage the shear band 62 and be attached.

Figure 16:
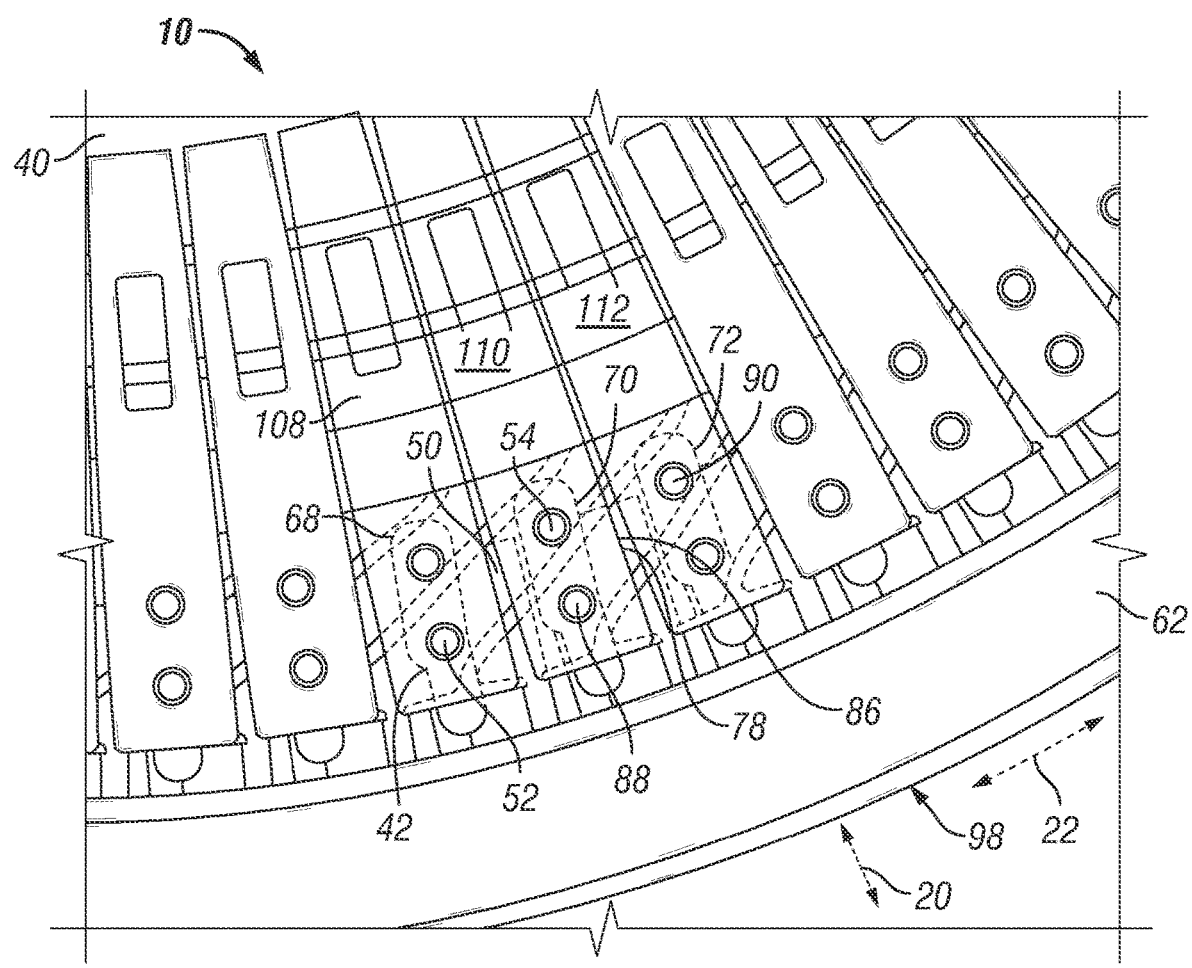
FIG. 16 is a bottom view of a portion of the apparatus with some retainers in phantom to show their interaction with the elements.

Another feature of the apparatus 10 may be the inclusion of retainers 108 that function to pull all of the elements 16 outward in the radial direction 20 for purposes of pulling the spokes 28 and applying pressure, and for purposes of causing the elements 16 to move inward in the radial direction 20 back to their initial locations. FIG. 16 shows a section of the apparatus 10 in which retainers 108 are disposed about the circumference of the apparatus 10. There may be the same number of retainers 108 as there are elements 16 in the apparatus 10. The retainers 108 can be associated with two of the elements 16 so that two of the elements 16 engage one of the retainers 108. As illustrated, a first retainer 108 is attached to the third projection 52 of the first element 42. The retainers 108 may all be at the bottom of the elements 16, or could be at the top of the elements 16 in other arrangements. The engagement between the third projection 52 and the first retainer 108 could be a rigid attachment so that there is no relative movement between the first element 42 and the first retainer 108 when the first element 42 moves, or the engagement can be a rotational engagement so that when the first element 42 moves, the first retainer 108 both moves in the radial direction 20 and rotates some amount about the third projection 52.

The second retainer 110 engages both the first element 42 and the second element 78. The fourth projection 54 of the first element 42 engages the second retainer 110, and the second element third projection 88 engages the second retainer 110. The second element 78 also includes a second element fourth projection 90 that engages the third retainer 112. Through engagement with these projections, the first element 42 is connected to the first retainer 108 and the second retainer 110, and this engagement may be rigid attachment or the first element 42 can pivot with respect to the first and second retainers 108 and 110. The second element 78 is attached to both the second retainer 110 and the third retainer 112 and again this attachment may be rigid or can be pivotal attachment.

The retainers 108, 110, 112 function to cause the elements 16 to move in unison in the radial direction 20. In this regard, if the first element 42 moves in the radial direction 20, its connection via the first retainer 108 causes the element 16 adjacent to it to move, and also because of its connection to the second retainer 110 causes the also attached second element 78 to move as well. Each retainer is connected to two adjacent elements 16 so that all of the elements 16 and retainers move all with one another as the radial movement member 24 actuates. The three retainers 108, 110, 112 and two elements 42, 78 shown are to describe how all of the retainers and elements can be arranged around the entire apparatus 10. Also, although shown at having each element 16 engage two of the retainers 108, 110 in other embodiments each of the elements 16 could engage 3, 4, 5 or from 6-10 of the retainers.

The elements 16 can align the spokes 28 and locate the spokes 28 onto a particular location of the shear band 62 that is within plus or minus 0.2 millimeters in the desired circumferential direction 22. The lower base section 40 can include stops or other features and may be machined to a precise degree to allow the spokes 28 and the shear band 62 to be located to a precision of plus or minus 0.2 millimeters in the desired longitudinal direction 34 so that the spokes 28 and shear band 62 are precisely attached so that the spokes 28 are within plus or minus 0.2 millimeters in the longitudinal direction 34 on the shear band 62. The application of uniform pressure to the spokes 28 achieves a consistent thickness of the adhesive 30 used to bond the spokes 28 to the shear band 62. The apparatus 10 accommodates spoke 28 to spoke 28 flange 94 thickness variations in assembly of the non-pneumatic tire 12.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An apparatus for assembling a non-pneumatic tire, comprising:
 a base;
 a plurality of elements that move relative to the base, wherein the elements have a central axis, wherein the elements are disposed in a circumferential direction around the central axis, wherein the central axis extends in a longitudinal direction;
a radial movement member that moves in a radial direction;
a hub;
a shear band;
a plurality of spokes that are attached to the hub, wherein the radial movement member moves outward in the radial direction and urges the elements to move relative to the base such that the elements urge the spokes to move outward in the radial direction, wherein adhesive engages the spokes and the shear band at an attachment location of the spokes and the shear band.

2. The apparatus as set forth in claim 1, wherein the radial movement member is offset from the spokes in the longitudinal direction such that the radial movement member and the spokes do not share any of the same locations in the longitudinal direction.

3. The apparatus as set forth in claim 1, wherein the radial movement member has a first pneumatic bladder and a second pneumatic bladder, wherein the spokes are located between the first pneumatic bladder and the second pneumatic bladder in the longitudinal direction when the elements urge the spokes outward in the radial direction, wherein the first pneumatic bladder is spaced from the second pneumatic bladder in the longitudinal direction and is free from engagement with the second pneumatic bladder.

4. The apparatus as set forth in claim 1, wherein from 64 to 80 spokes are present, and wherein from 64 to 80 elements are present.

5. The apparatus as set forth in claim 1, wherein the elements are located relative to the spokes in the radial direction such that the spokes are located both radially inward and radially outward of the elements when the elements urge the spokes outward in the radial direction.

6. The apparatus as set forth in claim 1, wherein the base has an upper base section and a lower base section that are spaced from one another in the longitudinal direction, wherein the spokes are between the upper base section and the lower base section in the longitudinal direction and are free from engagement with the upper base section and the lower base section, wherein the elements engage both the upper base section and the lower base section.

7. The apparatus as set forth in claim 6, wherein the elements comprising a first element that has a first projection and a second projection located at a first end of the first element, wherein the first element has a third projection and a fourth projection located at a second end of the first element;
wherein the upper base section has a plurality of upper slots that extend in the radial direction, wherein the upper slots comprise a first upper slot and a second upper slot, wherein the first projection is disposed in the first upper slot and wherein the second projection is disposed in the second upper slot, wherein the first upper slot is located adjacent the second upper slot in the circumferential direction;
wherein the lower base section has a plurality of lower slots that extend in the radial direction, wherein the lower slots comprise a first lower slot and a second lower slot, wherein the third projection is disposed in the first lower slot and wherein the fourth projection is disposed in the second lower slot, wherein the first lower slot is located adjacent the second lower slot in the circumferential direction;
wherein the plurality of spokes comprise a first spoke and a second spoke located adjacent to the first spoke in the circumferential direction, wherein the first element engages the first spoke.

8. The apparatus as set forth in claim 7, wherein the elements comprising a second element that has a second element first projection and a second element second projection located at a second element first end, wherein the second element has a second element third projection and a second element fourth projection located at a second element second end;
wherein the upper slots comprise a third upper slot located adjacent the second upper slot in the circumferential direction, wherein the second element first projection is located in the second upper slot, and wherein the second element second projection is located in the third upper slot;
wherein the lower slots comprise a third lower slot located adjacent the second lower slot in the circumferential direction, wherein the second element third projection is located in the second lower slot, and wherein the second element fourth projection is located in the third lower slot;
wherein the second element engages the second spoke.

9. The apparatus as set forth in claim 8, wherein the first spoke is free from engagement with the second element, and wherein the second spoke is free from engagement with the first element.

10. The apparatus as set forth in claim 1, wherein the spokes have V-shaped bodies, wherein the elements have ends that engage the spokes when the elements urge the spokes to move outward in the radial direction.

11. The apparatus as set forth in claim 1, wherein the body has a midsection thicker than legs that extend radially outward and inward from the midsection, wherein the ends of the elements are disposed within notches of the spokes.

12. The apparatus as set forth in claim 1, wherein when the elements urge the spokes to move outwards in the radial direction a portion of each one of the spokes moves outward in the radial direction while another portion of each one of the spokes remains stationary in the radial direction.

13. The apparatus as set forth in claim 1, wherein the spokes have flanges, wherein the adhesive is applied to the flanges of the spokes, wherein when the elements urge the spokes outward in the radial direction the flanges with the applied adhesive makes contact with an inner surface of the shear band at the attachment location.

14. The apparatus as set forth in claim 1, wherein the spokes define a notch between a flange of the spokes and a body of the spokes, wherein the elements are located inside of the notches when the elements urge the spokes outward in the radial direction.

15. The apparatus as set forth in claim 1, further comprising a plurality of retainers that engage the elements and that link the elements to one another such that movement of one of the elements is translated through the engaged retainers and are is translated to additional ones of the elements.

* * * * *